(12) United States Patent
Chang

(10) Patent No.: US 7,206,034 B2
(45) Date of Patent: Apr. 17, 2007

(54) PIXEL ELECTRODE WITH A SECOND APERTURE FORMED DIRECTLY ABOVE A FIRST APERTURE OF THE UPPER ELECTRODE OF THE STORAGE ELECTRODE

(75) Inventor: Ting-Jui Chang, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 10/709,637

(22) Filed: May 19, 2004

(65) Prior Publication Data

US 2005/0012871 A1 Jan. 20, 2005

(30) Foreign Application Priority Data

Jul. 18, 2003 (TW) .............. 92119649 U

(51) Int. Cl.
*G02F 1/1343* (2006.01)
(52) U.S. Cl. .......................... 349/38; 349/39
(58) Field of Classification Search ............ 349/38–48
See application file for complete search history.

(56) References Cited

U.S. PATENT DOCUMENTS 5,734,177 A * 3/1998 Sakamoto ................. 257/49
6,100,947 A * 8/2000 Katayama .................. 349/38
6,278,503 B1 * 8/2001 Nishikawa et al. .......... 349/39
2002/0105613 A1 * 8/2002 Yamakita et al. ........... 349/143
2004/0257488 A1 * 12/2004 Lee et al. ................... 349/43

FOREIGN PATENT DOCUMENTS

| CN | 1371016 A | 9/2002 |
|---|---|---|
| JP | 2002-122876 | 4/2002 |
| WO | WO 02/095492 A1 | 11/2002 |

* cited by examiner

*Primary Examiner*—Andrew Schechter
*Assistant Examiner*—Lucy Chien
(74) *Attorney, Agent, or Firm*—Jianq Chyun IP Office

(57) ABSTRACT

An active element array structure is provided. The active element array structure comprises a base plate and a plurality of gate lines, data lines, active devices, storage capacitors and pixel electrodes thereon. Each storage capacitor has an upper electrode and the upper electrode has at least an aperture. The direction of electric field crossing over the aperture forms an included angle with the alignment direction of an optically self-compensated birefringence liquid crystal layer. When an electric field is applied to the optically self-compensated birefringence liquid crystal layer, the liquid crystal molecules close to the aperture twist and rapidly transit from a splay state to a bend state. Thereafter, elastic force between the liquid crystal molecules spread the transition to the entire liquid crystal layer so that an optically self-compensated birefringence liquid crystal display is warmed up rapidly.

13 Claims, 5 Drawing Sheets

PIXEL ELECTRODE WITH A SECOND APERTURE FORMED DIRECTLY ABOVE A FIRST APERTURE OF THE UPPER ELECTRODE OF THE STORAGE ELECTRODE

CROSS REFERENCE TO RELATED APPLICATIONS

This application claims the priority benefit of Taiwan application serial no. 92119649, filed on Jul. 18, 2003.

BACKGROUND OF INVENTION

1. Field of the Invention

The present invention relates to an active element array structure. More particularly, the present invention relates to an active element array structure for an optically self-compensated birefringence liquid crystal display capable of twisting of liquid crystal molecules from a splay state to a bend state rapidly.

2. Description of the Related Art

Rapid progress in semiconductor devices and man-machine interface products has lead to a proliferation of multimedia systems in our society. In the past, cathode ray tube (CRT) has dominated the market because of its price and superb quality. Although the conventional CRT has many advantages, the design of the electron gun renders it heavy and is a potential source of radiation. With big leaps in the techniques in manufacturing semiconductor devices and optical devices, thin film transistor (TFT) liquid crystal displays (LCD) have gradually become main-stream display products. This is because a TFT LCD has an exceptional picture quality, a high spatial utilization and a low power consumption and provides a radiation-free environment.

In general, liquid crystal displays can be classified according to the liquid crystal type, the driving method and the positioning of the light source. The OCB (optically self-compensated birefringence) LCD is one type of LCD having a rapid response speed suitable for displaying a succession of rapidly changing pictures in an animation show or broadcasting movies through a computer. The OCB also stands for Optically Compensated Bend, and Optically Compensated Birefringence respectively. However, before the optically self-compensated birefringence liquid crystal display can be used for the rapid display of pictures, the liquid crystal molecules within the display must first be transited from a splay state to a bend state.

FIG. 1A is a schematic view showing the liquid crystal molecules inside a conventional optically self-compensated birefringence liquid crystal display in a splay state. FIG. 1B is a schematic view showing the liquid crystal molecules inside a conventional optically self-compensated birefringence liquid crystal display in a bend state. As shown in FIGS. 1A and 1B, the optically self-compensated birefringence liquid crystal molecules 100 are positioned between a top substrate 110 and a bottom substrate 120. The top substrate 110 and the bottom substrate 120 both have an alignment layer with rubbing direction parallel to each other. Before the optically self-compensated birefringence liquid crystal molecules 100 are subjected to an electric field, the liquid crystal molecules are aligned in a splay state. Prior to using the optically self-compensated birefringence liquid crystal display, the liquid crystal molecules 100 must be activated to an idling state through an electric field applied in a direction perpendicular to the top substrate 110. In other words, the liquid crystal molecules 100 must be transited into a bend state. Before the pixel of a conventional optically self-compensated birefringence liquid crystal display can be driven normally, a few minutes must be set aside for the transition of the liquid crystal molecules from the splay state to the bend state. That means, a long warm up period is required before the display is in an idle state. However, instant operation is essential for any type of display. Hence, an optically self-compensated birefringence liquid crystal display must have a fast transition period before it is acceptable to most consumers.

Among the conventional techniques for speeding up the transition, one method uses a special driving method to kick-start the transition. Another method uses a special pixel design to alter the alignment of a portion of the liquid crystal molecules so that the transition from a splay state to a bend state is faster.

SUMMARY OF INVENTION

Accordingly, one object of the present invention is to provide an optically self-compensated birefringence liquid crystal display having a shorter splay state to bend state transition period.

To achieve these and other advantages and in accordance with the purpose of the invention, as embodied and broadly described herein, the invention provides an active device array structure for twisting the alignment of liquid crystal molecules from a splay state to a bend state rapidly. The active device array structure comprises a base plate and a plurality of gate lines, data lines, active elements, storage capacitors and pixel electrodes thereon. A pixel area is formed between any two adjacent gate lines and any two adjacent data lines. Each of the active devices is formed in an intersection region between the gate line and the data line and is electrically connected to the corresponding gate line and data line respectively. Each storage capacitor has an upper electrode with at least a first aperture. Furthermore, the direction of electric field adjacent to the first aperture being at a predetermined angle to an alignment direction of the liquid crystal molecules, the liquid crystal layer possessing a transition from a splay state to a bend state while operating. The pixel electrodes are disposed over the pixel areas and are electrically connected to the corresponding active devices and the corresponding upper electrodes. When the first aperture is located beneath the pixel electrode, each pixel electrode further includes at least a second aperture above the first aperture.

Through the aperture design, the alignment of the optically self-compensated birefringence liquid crystal molecules in the neighborhood of the aperture will be twisted when a voltage is applied during operation. This leads to a rapid transition of the liquid crystal molecules from a splay state to a bend state. After the rapid local re-alignment of the optically self-compensated birefringence liquid crystal molecules, elastic forces between liquid crystal molecules will spread and accelerate pixel transition. Ultimately, there is a reduction in the warm-up period for the optically self-compensated birefringence liquid crystal display.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1A:
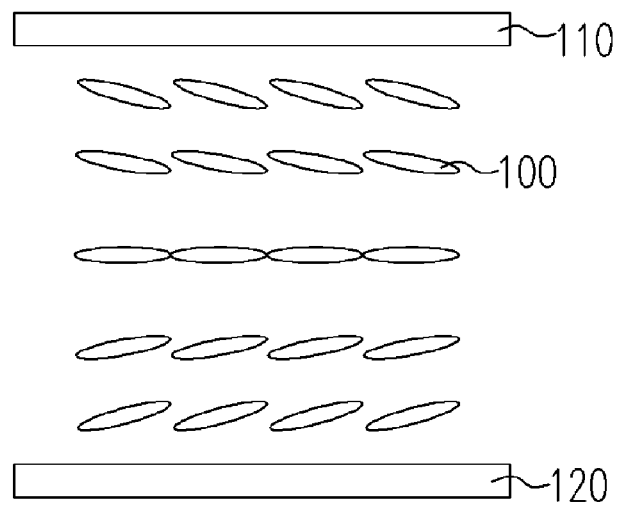
FIG. 1A is a schematic view showing the liquid crystal molecules inside a conventional optically self-compensated birefringence liquid crystal display in a splay state.
Figure 1B:
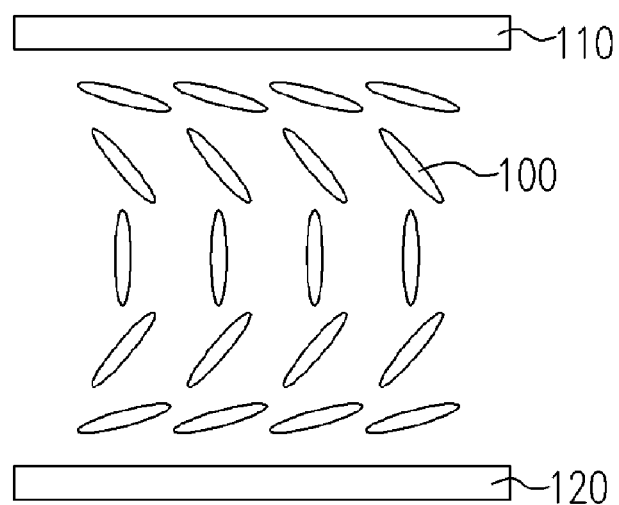
FIG. 1B is a schematic view showing the liquid crystal molecules inside a conventional optically self-compensated birefringence liquid crystal display in a bend state.

Reference will now be made in detail to the present preferred embodiments of the invention, examples of which are illustrated in the accompanying drawings. Wherever possible, the same reference numbers are used in the drawings and the description to refer to the same or like parts.

Figure 2:
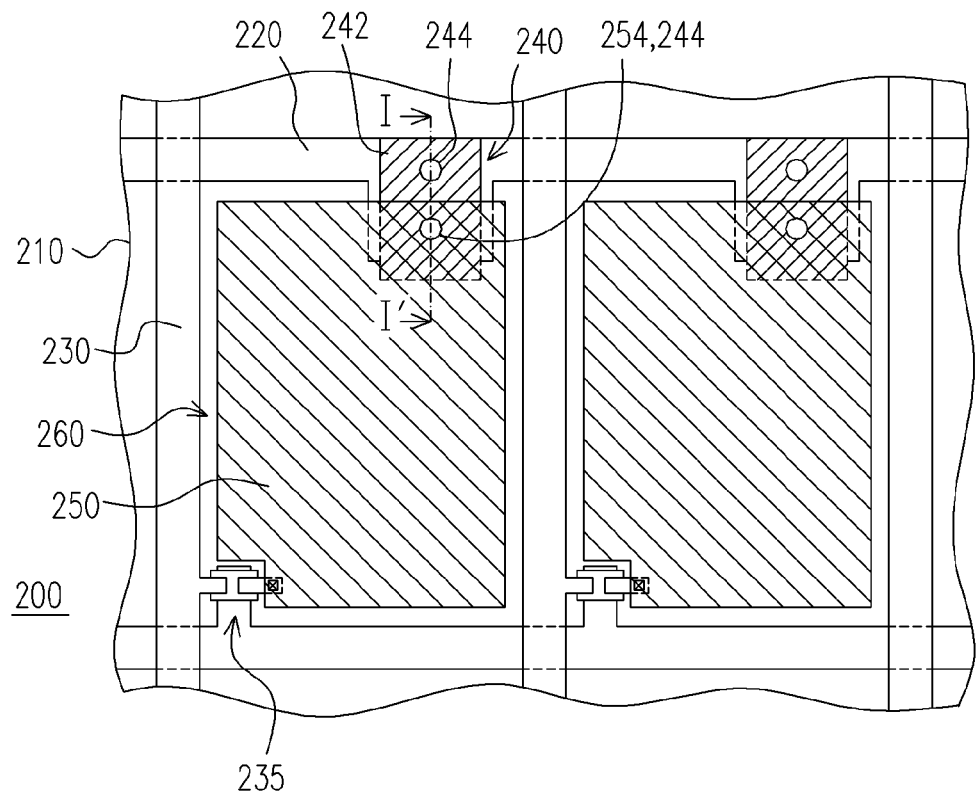
FIG. 2 is a top view showing an active array structure according to one preferred embodiment of this invention.

FIG. 2 is a top view showing an active array structure according to one preferred embodiment of this invention. As shown in FIG. 2, the active device array structure 200 comprises a base plate 210 and a plurality of gate lines 220, data lines 230, active devices 235, storage capacitors 240 and pixel electrodes 250 thereon. The gate lines 220 are disposed over the base plate 210 and aligned in a direction parallel to each other. Similarly, the data lines 230 are also disposed over the base plate 210 and aligned in a direction parallel to each other. However, the data lines 230 run in a direction perpendicular to the gate lines 220. A pixel region 260 is between any two adjacent gate lines 220 and any two adjacent data lines 230. The active device 235 is a thin film transistor formed in an intersection region between the gate line 220 and the data line 230, for example. The active device 235 is electrically connected to a corresponding gate line 220 and a data line 230 respectively. The pixel electrode 250 is a transparent electrode or a reflective electrode disposed over the pixel region 260, for example. The pixel electrode 250 is electrically connected to a corresponding active device 235.

In this embodiment, the storage capacitor 240 is built over the gate line 220 (Cst on gate). The capacitor 240 has an upper electrode 242. The upper electrode 242 connects electrically with the pixel electrode 250 and couples electrically with a portion of the gate line 220 underneath. The upper electrode 242 is disposed over a portion of the gate line 220 and has at least a first aperture 244. Furthermore, the direction of the electric field adjacent to the first aperture 244 being at a predetermined angle to an alignment direction of the OCB liquid crystal molecules, the OCB liquid crystal layer possessing a transition from a splay state to a bend state while operating.

Figure 3:
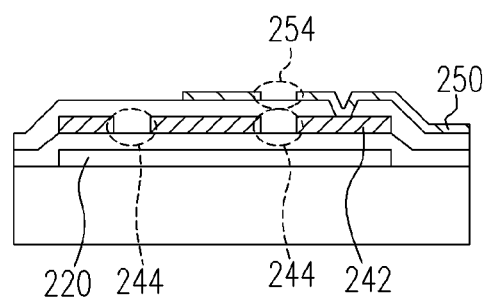
FIG. 3 is a cross-sectional view along line I–I" of the active device array structure shown in FIG. 2.

FIG. 3 is a cross-sectional view along line I–I' of the active device array structure shown in FIG. 2. As shown in FIGS. 2 and 3, with first aperture 244 located underneath the pixel electrode 250, each pixel electrode 250 further includes at least a second aperture 254 formed over the first aperture 244.

Figure 4:
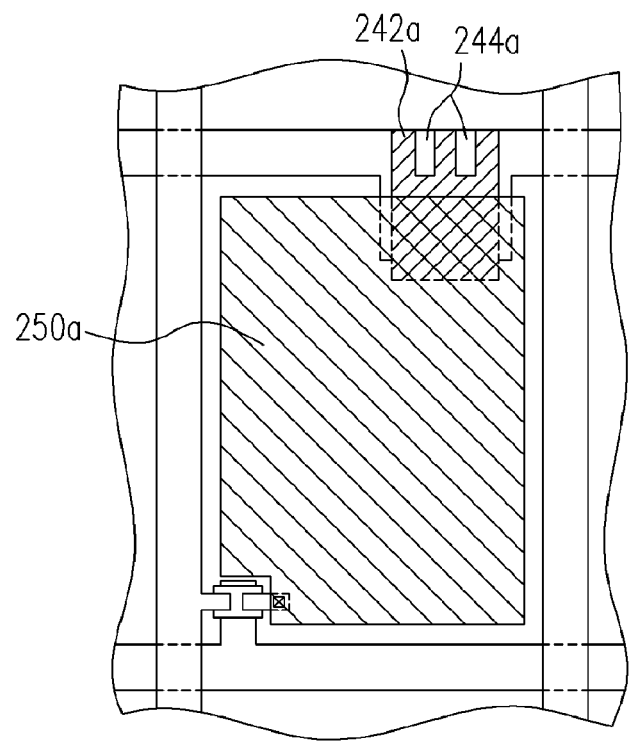
FIGS. 4 and 5 are top views showing an alternative active array structure according to one preferred embodiment of this invention.
Figure 5:
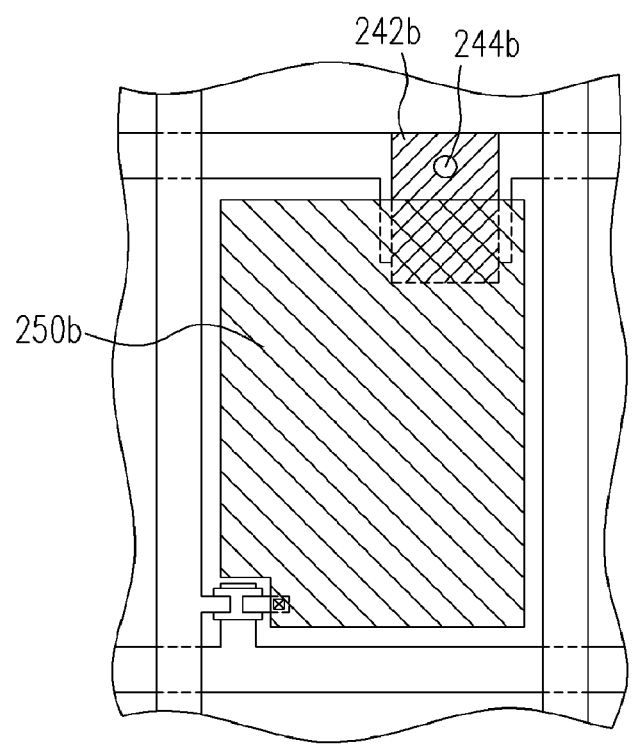

Furthermore, there is no restriction on the shape of the aperture on the upper electrode. FIGS. 4 and 5 are top views showing an alternative active array structure according to one preferred embodiment of this invention. In FIG. 4, the upper electrode 242a has two rectangular apertures 244a and the pixel electrode 250a does not cover the rectangular apertures 244a. In FIG. 5, the upper electrode 242b has a circular aperture 244b and the pixel electrode 250b does not cover the circular aperture 244b.

Figure 6:
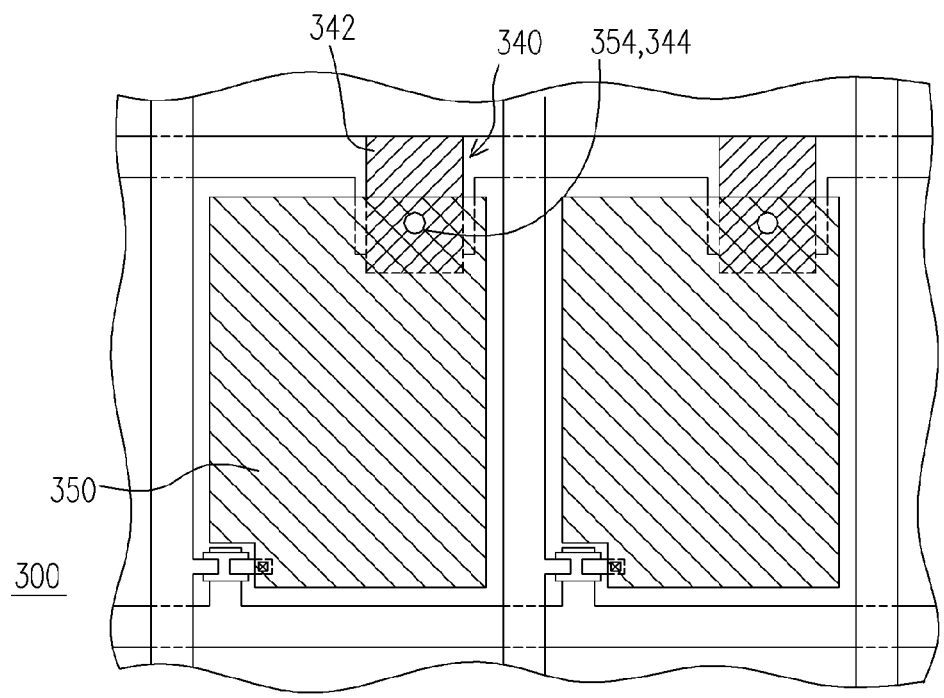
FIGS. 6 and 7 are top views showing yet another active array structure according to one preferred embodiment of this invention.
Figure 7:
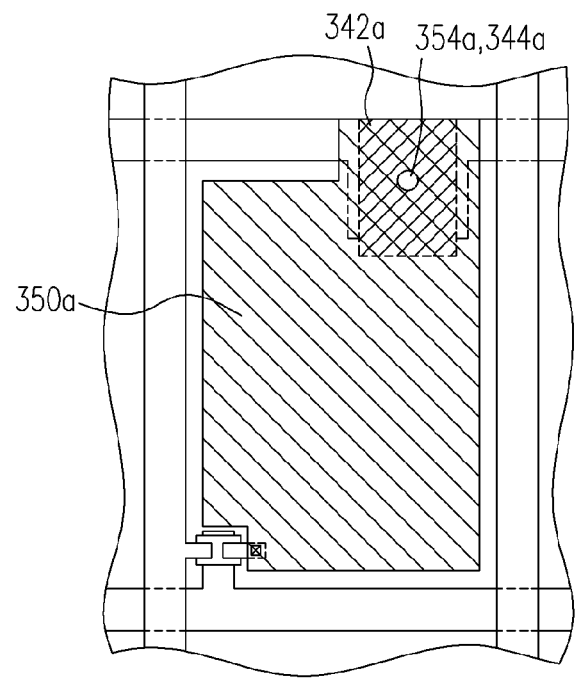

In addition, the aperture on the upper electrode could also be located only underneath the pixel electrode. FIGS. 6 and 7 are top views showing yet another active array structure according to one preferred embodiment of this invention. In FIG. 6, the storage capacitor 340 in the active device structure 300 has an upper electrode 342. The upper electrode 342 has at least a first aperture 344 and the pixel electrode 350 has at least a second aperture 354. The second aperture 354 is located above the first aperture 344. The direction of the electric field close to the second aperture 354 forms an included angle with the alignment direction of the optically self-compensated birefringence liquid crystal layer. In FIG. 7, the pixel electrode 350a covers the upper electrode 342a. Furthermore, the pixel electrode 350a has a second aperture 354a and the upper electrode 342a has a first aperture 344a. The second aperture 354a is formed over the first aperture 344a.

Figure 8:
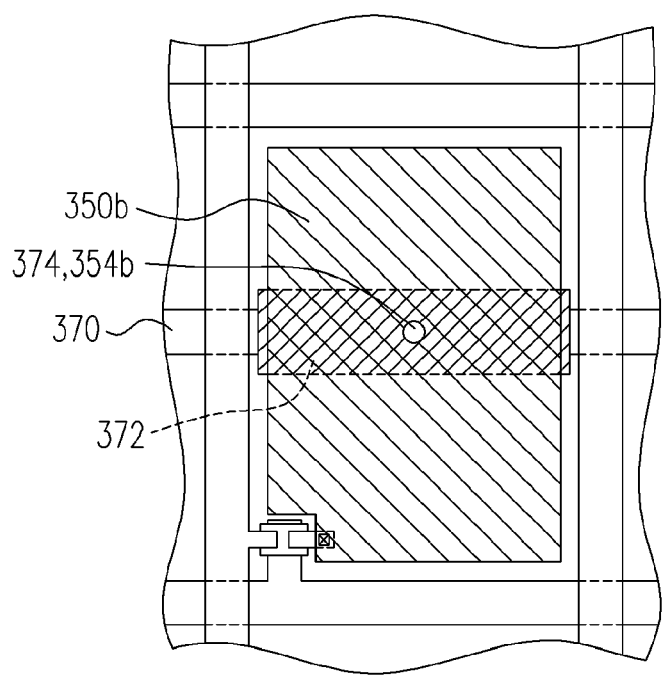
FIG. 8 is a top view showing yet another active array structure according to one preferred embodiment of this invention.

It is to be noted that the upper electrode is not limited to a position over a portion of the gate line according to the embodiment of this invention. Anyone familiar with such technologies will notice that the active device array structure may further include a plurality of common lines formed between the gate lines. The upper electrode is disposed over a portion of the common line area so that the upper electrode and the common line together constitute a storage capacitor (Cst on common). FIG. 8 is a top view showing yet another active array structure according to one preferred embodiment of this invention. In FIG. 8, the pixel electrode 350b has a second aperture 354b and the upper electrode 372 has a first aperture 374. The second aperture 354b is located above the first aperture 374 and the upper electrode 372 is disposed over a portion of the common line 370.

Figure 9:
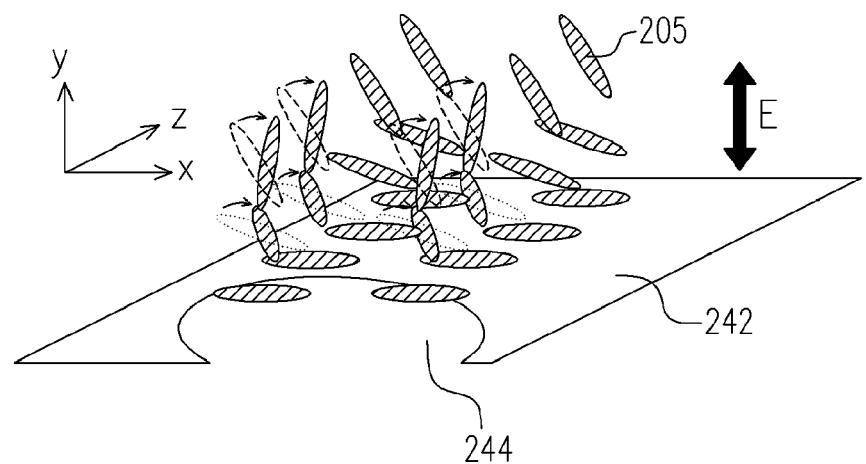
FIG. 9 is a perspective view showing the alignment of optically self-compensated birefringence liquid crystal molecules in the neighborhood of a first aperture according to this invention.

FIG. 9 is a perspective view showing the alignment of optically self-compensated birefringence liquid crystal molecules in the neighborhood of a first aperture according to this invention. As shown in FIG. 9, the optically self-compensated birefringence liquid crystal molecules 205 are in a splay state with alignment in the x-direction initially. On the application of a voltage to the upper electrode 242, the optically self-compensated birefringence liquid crystal molecules 205 in most areas will be affected by the initial vertical electric field E pointed in the vertical direction (the y-direction). Hence, the liquid crystal molecules 205 will gradually increase their respective slant angles to transit into an asymmetric splay state and then transit into a bend state using the z-axis as a center of rotation. Because the transition of the optically self-compensated birefringence liquid crystal molecules 205 from a splay state via an asymmetric splay state to a bend state involves a discontinuous elastic force, the transition must be completed within a longer time frame through the electric field.

However, in the presence of the first aperture 244, there is considerable variation of the electric field nearby so that the optically self-compensated birefringence liquid crystal molecules 205 will also sense an electric field perpendicular to the y-axis. Together with a suitably selected liquid crystal alignment direction set at a particular included angle from a direction perpendicular to the y-axis, the optically self-compensated birefringence liquid crystal molecules 205 will twist using the y-axis as a center of rotation. Because the elastic force involved in the transition of the liquid crystal molecules 205 from the splay state to the twisted state and finally to the bend state is continuous, the transition is rapid in this local region. Thereafter, this local transition may serve as a center for rapidly spreading the transition throughout the pixel through the elastic force of the liquid crystal molecules. Similarly, the aperture in the pixel electrode according to the second embodiment of this invention will also produce the same effect in the liquid crystal molecules.

In summary, the active device array structure according to this invention has at least the following advantages:

1. Due the presence of an aperture in the pixel electrode or the upper electrode, the optically self-compensated birefringence liquid crystal molecules within the entire pixel region are rapidly transited from a splay state to a bend state. Hence, the warm-up period required to activate an optically self-compensated birefringence liquid crystal display is reduced considerably.

2. The optically self-compensated birefringence liquid crystal display can be fabricated using compatible conventional processes. Therefore, no additional cost is incurred when the fabrication process according to this invention is adopted.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. An active device array structure for rapidly twisting the alignment of liquid crystal molecules from a splay state to a bend state, the active device array structure comprising:
   a base plate;
   a plurality of gate lines disposed over the base plate;
   a plurality of data lines disposed over the base plate, wherein a pixel area is formed between any two adjacent gate lines and any two adjacent data lines;
   a plurality of active devices disposed over the base plate, wherein each active device is formed in an intersection region between the gate line and the data line and electrically connected to corresponding gate line and data line;
   a plurality of storage capacitors disposed over the base plate, wherein each storage capacitor has an upper electrode having at least a first aperture; and
   a plurality of pixel electrodes disposed over the pixel area, wherein each of the pixel electrodes is respectively electrically connected to the corresponding active device and the corresponding upper electrode, and the upper electrode of each storage capacitor is located underneath an edge of the corresponding pixel electrode wherein each of pixel electrodes further comprises at least a second aperture the first aperture is located underneath the pixel electrode, and the second aperture is formed directly above the first aperture.

2. The active device array structure of claim 1, wherein the gate lines are formed in parallel over the base plate, the data lines are formed in parallel over the base plate, and the gate lines are perpendicular to the date lines.

3. The active device array structure of claim 1, wherein the active devices comprise thin film transistors.

4. The active device array structure of claim 1, wherein the pixel electrodes comprise transparent electrodes.

5. The active device array structure of claim 1, wherein the pixel electrodes comprise reflective electrodes.

6. The active device array structure of claim 1, wherein the upper electrode is disposed over a portion of the gate line occupied area to form a storage capacitor.

7. The active device array structure of claim 1, further comprises a plurality of common lines formed between the gate lines, and the upper electrode is disposed over a portion of the common line occupied area to form a storage capacitor.

8. An active device array structure, the active device array structure comprising:
   a base plate;
   a plurality of gate lines disposed over the base plate;
   a plurality of data lines disposed over the base plate, wherein a pixel area is formed between any two adjacent gate lines and any two adjacent data lines;
   a plurality of active devices disposed aver the base plate, wherein each active device is fanned in an intersection region between the gate line and the data line and electrically connected to corresponding gate line and data line;
   a plurality of storage capacitors disposed over the base plate, wherein each storage capacitor has an upper electrode having at least a first aperture, and the first aperture is surrounded by the upper electrode; and
   a plurality of pixel electrodes disposed over the pixel area, wherein each the pixel electrodes is respectively electrically connected to the corresponding active device and the corresponding upper electrode.

9. The active device array structure of claim 8, wherein the pixel electrodes comprise transparent electrodes.

10. The active device array structure of claim 8, wherein the pixel electrodes comprise reflective electrodes.

11. The active device array structure of claim 8, wherein the upper electrode is disposed over a portion of the gate line occupied area to form a storage capacitor.

12. The active device array structure of claim 8, further comprises a plurality of common lines formed between the gate lines, and the upper electrode is disposed over a portion of the common line occupied area to form a storage capacitor.

13. The active device array structure of claim 8, wherein each of pixel electrodes further comprises at least a second aperture the first aperture is located underneath the pixel electrode, and the second aperture is formed directly above the first aperture.

* * * * *